(12) United States Patent
Kim et al.

(10) Patent No.: US 7,012,662 B2
(45) Date of Patent: Mar. 14, 2006

(54) TRANSFLECTIVE LCD WITH TWIST ANGLE LESS THAN 90 DEGREES AND 4 COMPENSATION FILMS

(75) Inventors: Jae-Hyun Kim, Seoul (KR); Sang-Woo Kim, Suwon (KR); Sung-Eun Cha, Keoje (KR); Yong-Kyu Jang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 226 days.

(21) Appl. No.: 10/740,631

(22) Filed: Dec. 22, 2003

(65) Prior Publication Data

US 2004/0218126 A1 Nov. 4, 2004

(30) Foreign Application Priority Data

Dec. 23, 2002 (KR) ...................... 10-2002-0082411

(51) Int. Cl.
*G02F 1/1335* (2006.01)

(52) U.S. Cl. .................. 349/114; 349/119; 349/121

(58) Field of Classification Search ............... 349/119, 349/121, 117
See application file for complete search history.

(56) References Cited

U.S. PATENT DOCUMENTS

| | | | | |
|---|---|---|---|---|
| 6,057,901 A | * | 5/2000 | Xu | 349/121 |
| 6,801,283 B1 | * | 10/2004 | Koyama et al. | 349/119 |
| 6,819,381 B1 | * | 11/2004 | Mi et al. | 349/117 |
| 6,825,902 B1 | * | 11/2004 | Kaneko | 349/114 |
| 6,831,722 B1 | * | 12/2004 | Ishikawa et al. | 349/117 |
| 2004/0135949 A1 | * | 7/2004 | Maeda | 349/119 |
| 2005/0105025 A1 | * | 5/2005 | Ootake | 349/114 |

* cited by examiner

*Primary Examiner*—Andrew Schechter
*Assistant Examiner*—David Y. Chung

(57) ABSTRACT

A color filter array panel and a TFT array panel face each other, and a liquid crystal layer is interposed between the two panels such that the liquid crystal molecules of the liquid crystal layer are twisted by 72°. A $\lambda/2$ compensation film and a $\lambda/4$ compensation film are disposed on outer surfaces of the color filter array panel and the TFT array panel, respectively. Upper and lower polarizers are disposed on the respective compensation films. The $\lambda/2$ compensation film and the $\lambda/4$ compensation film have predetermined retardations and the drawing axes having predetermined azimuthal angles.

6 Claims, 13 Drawing Sheets

TRANSFLECTIVE LCD WITH TWIST ANGLE LESS THAN 90 DEGREES AND 4 COMPENSATION FILMS

CROSS-REFERENCE TO RELATED APPLICATION

This application claims the benefit of Korean Patent Application No. 2002-0082411, filed on Dec. 23, 2002, which is hereby incorporated by reference for all purposes as if fully set forth herein.

BACKGROUND OF THE INVENTION (a) Field of the Invention

The present invention relates to a liquid crystal display, and in particular, to a transflective liquid crystal display.

(b) Description of Related Art

Generally, a liquid crystal display (LCD) includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCDs are classified into a transmissive type LCD and a reflective type LCD depending upon whether it uses a separate backlight for a light source or an external light for that purpose. Recently, a transflective LCD operating both in a transmissive mode and in a reflective mode has been developed.

However, the transflective LCD has electro-optical characteristics depending upon the operating modes, and a given characteristic may be good for one of the two modes, while it may not be good for the other mode. For example, a cell gap and a twist angle optimized in the transmissive mode may cause the deterioration of the reflectance and the contrast ratio in the reflective mode so that the LCD may not perform a normal operation.

Furthermore, the transflective LCD has a problem of poor front transmittance and poor vertical viewing angle such that its white characteristic and contrast at about 25° up and down are radically deteriorated.

SUMMARY OF THE INVENTION

It is a motivation of the present invention to provide a transflective LCD which exhibits excellent characteristics both in a reflective mode and in a transmissive mode.

A liquid crystal display is provided, which includes: a first substrate having inner and outer surfaces; a transparent electrode formed on the inner surface of the first substrate; a reflective electrode formed on the transparent electrode and having a transmissive window overlapping a portion of the transparent electrode; a thin film transistor connected to the transparent electrode and the reflective electrode; a second substrate having an inner surface facing the inner surface of the first substrate and an outer surface; a common electrode formed on the inner surface of the second substrate; a liquid crystal layer interposed between the first substrate and the second substrate; a first polarizing film disposed on the outer surface of the first substrate; first and second compensation films interposed between the first substrate and the first polarizing film; a second polarizing film disposed on the outer surface of the second substrate; and third and fourth compensation films interposed between the second substrate and the second polarizing film, wherein liquid crystal molecules of the liquid crystal layer are aligned twisted from the first substrate to the second substrate by a predetermined twist angle ranging from about 62° to about 82°.

When, from a front view, a horizontal direction is defined as an x direction and a vertical direction is defined as a y direction, a director of the liquid crystal layer has an azimuthal angle of 170–250°.

The third compensation film makes a retardation of about 130–150 nm for a light with a wavelength of 550 nm, and a stretch axis of the third compensation film has an azimuthal angle ranging from about 96° to about 116°, and the fourth compensation film makes a retardation of about 250–270 nm for a light with a wavelength of 550 nm, and a stretch axis of the fourth compensation film has an azimuthal angle ranging from about 154° to about 174°.

The first and the second compensation films satisfy any one of the following three conditions:

First, the first compensation film makes a retardation of about 135–155 nm for a light with a wavelength of about 550 nm, and a stretch axis of the first compensation film has an azimuthal angle ranging from about 154° to about 174°, and the second compensation film makes a retardation of about 260–280 nm for a light with a wavelength of 550 nm, and a stretch axis of the second compensation film has an azimuthal angle ranging from about 95° to about 115°;

Second, the first compensation film makes a retardation of about 130–150 nm for a light with a wavelength of about 550 nm, and a stretch axis of the first compensation film has an azimuthal angle ranging from about 152° to about 172°, and the second compensation film makes a retardation of about 260–280 nm for a light with a wavelength of 550 nm, and a stretch axis of the second compensation film has an azimuthal angle ranging from about 94° to about 114°; and Third, the first compensation film makes a retardation of about 130–150 nm for a light with a wavelength of about 550 nm, and a stretch axis of the first compensation film has an azimuthal angle ranging from about 154° to about 174°, and the second compensation film makes a retardation of about 260–280 nm for a light with a wavelength of 550 nm, and a stretch axis of the second compensation film has an azimuthal angle ranging from about 95° to about 115°.

It is preferable that the second polarizer has an absorption axis located at an azimuthal angle ranging from about −10° to about 10°, and the first polarizer has an absorption axis located at an azimuthal angle ranging from about 80° to about 100°.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
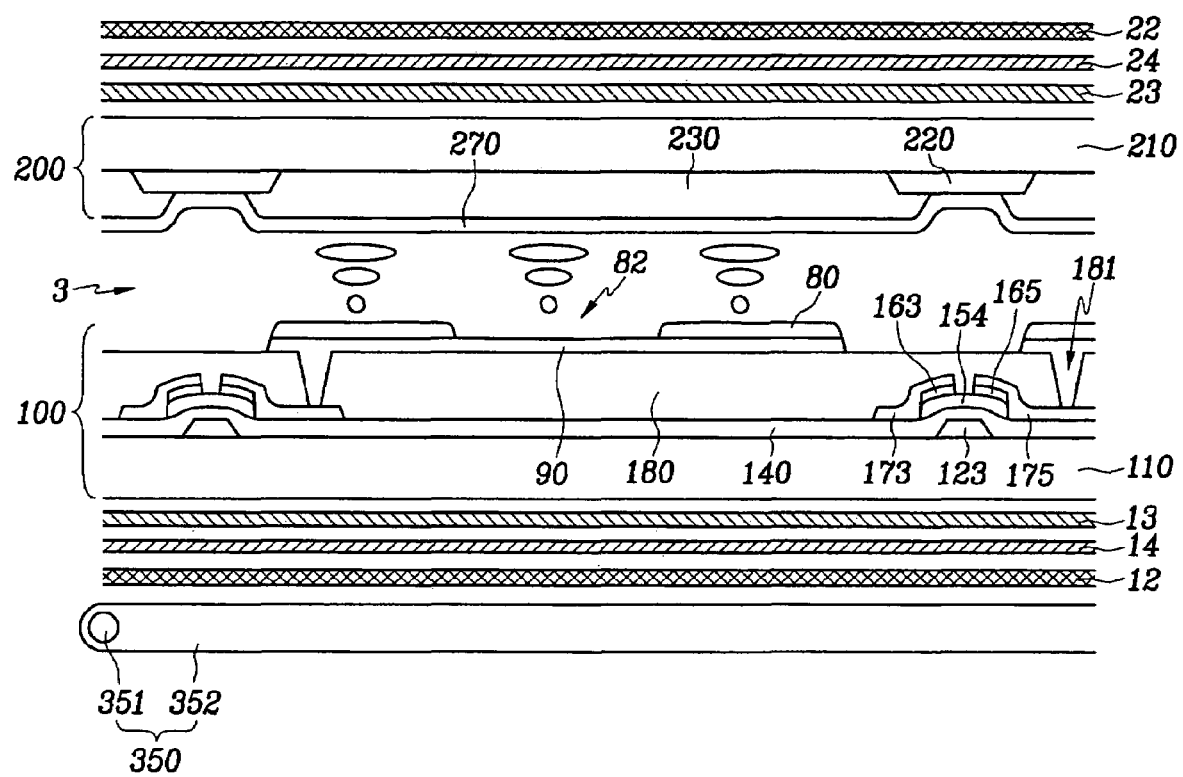
FIG. 1 is a sectional view of an LCD according to an embodiment of the present invention.

The present invention now will be described more fully hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, transflective LCDs according to embodiments of this invention will be described in detail with reference to the accompanying drawings.

FIG. 1 is a sectional view of an LCD according to an embodiment of the present invention.

Referring to FIG. 1, an LCD according to an embodiment of the present invention includes a TFT array panel 100, a color filter array panel 200 facing the TFT array panel 100, a liquid crystal (LC) layer 3 interposed between inner surfaces of the TFT array panel 100 and the color filter array panel 200, lower compensation films 13 and 14 attached on an outer surface of the TFT array panel 100, upper compensation films 23 and 24 attached on an outer surface of the color filter array panel 200, a lower polarizer 12 attached on an outer surface of the second lower compensation film 14, an upper polarizer 22 attached on an outer surface of the second upper compensation film 24, and a backlight unit 350 placed under the lower polarizer 12.

The LC molecules of the LC layer 3 are aligned parallel to the inner surfaces of the panels 100 and 200 and twisted from the inner surface of the TFT array panel 100 to the inner surface of the color filter array panel 200 by a predetermined twist angle and such an alignment is called a twisted nematic (TN) mode. The twist angle of the LC molecules is in a range between about 62° and about 82°.

When the LCD is viewed from the front side, i.e., from the color filter panel 200, a horizontal direction is defined as an x direction and a vertical direction is defined as a y direction. The director of the LC layer 3 has an azimuthal angle ranging from about 170° to about 250°. A cell gap, i.e., the thickness of the LC layer 3 is about 3 microns, and the refractive anisotropy Δn of the LC layer 3 is about 0.078 for light with a wavelength of 589 nm.

The LC layer 3 is encapsulated between the TFT array panel 100 and the color filter array panel 200 by way of a sealant (not shown).

The upper and lower polarizers 22 and 12 are aligned such that their absorption axes are perpendicular to each other. In this case, the absorption axis of the upper polarizer 22 has an azimuthal angle ranging from about −10° to about 10°, and the absorption axis of the lower polarizer 12 has an azimuthal angle ranging from about 80° to about 100°.

The first lower and upper compensation films 13 and 23 are λ/4 phase difference films and the second lower and upper compensation films 14 and 24 are λ/2 phase difference films.

The first upper compensation film 23 makes a retardation Δnd ranging from about 130 nm to about 150 nm for light with a wavelength of 550 nm, and it is aligned such that its stretch axis has an azimuthal angle ranging from about 96° to about 116°.

The second upper compensation film 24 makes a retardation Δnd ranging from about 250 nm to about 270 nm for light with a wavelength of 550 nm, and it is aligned such that its stretch axis has an azimuthal angle ranging from about 154° to about 174°.

The first and second lower compensation films 13 and 14 satisfy one of the following three conditions.

First, the first lower compensation film 13 makes a retardation Δnd ranging from about 135 nm to about 155 nm for light with a wavelength of 550 nm, and it is aligned such that its stretch axis has an azimuthal angle ranging from about 154° to about 174°. Furthermore, the second lower compensation film 14 makes a retardation Δnd ranging from about 260 nm to about 280 nm for light with a wavelength of 550 nm, and it is aligned such that its stretch axis has an azimuthal angle ranging from about 95° to about 115°.

Second, the first lower compensation film 13 makes a retardation Δnd ranging from about 130 nm to about 150 nm for light with a wavelength of 550 nm, and it is aligned such that its stretch axis has an azimuthal angle ranging from about 152° to about 172°. Furthermore, the second lower compensation film 14 makes a retardation Δnd ranging from about 260 nm to about 280 nm for light with a wavelength of 550 nm, and it is aligned such that its stretch axis has an azimuthal angle ranging from about 94° to about 114°.

Third, the first lower compensation film 13 makes a retardation Δnd ranging from about 130 nm to about 150 nm for light with a wavelength of 550 nm, and it is aligned such that its stretch axis has an azimuthal angle ranging from about 154° to about 174°. Furthermore, the second lower compensation film 14 makes a retardation Δnd ranging from about 265 nm to about 285 nm for light with a wavelength of 550 nm, and it is aligned such that its stretch axis has an azimuthal angle ranging from about 95° to about 115°.

Both a transparent electrode 90 and a reflective electrode 80 are provided in each pixel area of the TFT array panel 100. A transmissive window 82 is provided at the reflective electrode 80 such that the LCD can operate both in a reflective mode and in a transmissive mode. When the LCD operates in the reflective mode, it turns off the backlight 351, while it turns on the backlight 351 in the transmissive mode. With the turning on or off of the backlight 351, the driving schemes may be varied depending on the modes of the LCD. For example, different sets of gray voltages are applied for the reflective mode and to the transmissive mode. In order to differentiate the gray voltage sets in the two modes, different sets of the reference gamma resistances or digital gamma data to be converted into analog gray voltages may be used. In addition, the bit number of output image data in the reflective mode may be lower than that in the transmissive mode, and simultaneously, the frame rate control (FRC) is applied for the reflective mode.

The TFT array panel 100 for the LCD will be now described more specifically.

A plurality of gate lines extending substantially in a horizontal direction and including a plurality of gate electrodes 123 is formed on an insulating substrate 110. The gate electrodes 123 may have a single-layered structure preferably made of low resistivity material such as Ag, Ag alloy, Al, Al alloy, Cu and Cu alloy or a multiple-layered structure including a low resistivity layer and a contact layer preferably made of a material having a good contact characteristic with other materials.

A gate insulating layer 140 preferably made of silicon nitride (SiNx) is formed on the gate electrodes 123.

A plurality of semiconductor members 154 preferably made of hydrogenated amorphous silicon are formed on the gate insulating layer 140 opposite the gate electrodes 123. A plurality of ohmic contacts 163 and 165 preferably made of silicide or hydrogenated amorphous silicon heavily doped with n type impurities are formed on the semiconductor members 154.

A plurality of data lines including a plurality of source electrodes 173 and a plurality of drain electrodes 175 are formed on the ohmic contacts 163 and 165 and the gate insulating layer 140. The source electrodes 173 and the drain electrodes 175 are preferably made of a low resistivity material such as Al and Ag. The data lines intersect the gate lines to define a plurality of pixel areas, and the source electrodes 173 are branched from the data lines and extend onto the ohmic contacts 163. The drain electrodes 175 are separated from the source electrodes 173 and located at least in part on the ohmic contacts 165 opposite to the source electrodes 173 with respect to the gate electrodes 123.

A protective layer 180 is formed on the source and the drain electrodes 173 and 175 and on portions of the semiconductor members 154, which are not covered with the source and the drain electrodes 173 and 175. The protective layer 180 is preferably made of an inorganic material such as silicon nitride or an acryl-based organic insulating material. The protective layer 180 may be made of a low dielectric chemical vapor deposition (CVD) layer such as an a-Si:C:O layer or an a-Si:O:F layer deposited by a plasma enhanced chemical vapor deposition (PECVD), which has a very low dielectric constant less than 4 so that the parasitic capacitance including the layer even having small thickness is very small. Furthermore, the PECVD a-Si:C:O or a-Si:O:F layer has excellent adhesiveness and excellent step coverage compared with other layers and its thermal resistance is excellent compared with the organic insulating layer since it is an inorganic CVD layer. In addition, the PECVD a-Si:C:O or a-Si:O:F layer is very advantageous in the processing time since a deposition speed or an etching speed of the layer is about four to ten times that of the silicon nitride layer.

A plurality of transparent electrodes 90 are formed on the protective layer 180 such that they are located in the pixel areas and electrically connected to the drain electrodes 175 through a plurality of contact holes 181 formed at the protective layer 180. The transparent electrodes 90 are preferably made of indium tin oxide (ITO) or indium zinc oxide (IZO).

A plurality of reflective electrodes 80 forming pixel electrodes along with the transparent electrodes 90 are formed on the transparent electrodes 90. The reflective electrodes 80 are preferably made of a reflective conductive material such as Al, Al alloy, Ag, Ag alloy, Mo and Mo alloy. Each reflective electrode 80 has at least one transmissive window 82 partially exposing the underlying transparent electrode 90. The transmissive window 82 of the reflective electrode 80 may have various shapes.

The color filter array panel 200 includes a black matrix 220, a plurality of color filters 230, and a common electrode 270. The black matrix 220 defines a plurality of pixel areas where the color filters 230 of red, green and blue colors are provided. The common electrode 270 is placed on the color filters 230 and preferably made of a transparent conductive material such as ITO and IZO.

Various electro-optical characteristics of the LCD having the above-described configuration will be now considered.

TABLE 1 shows a condition of #1, a condition of #2, and a condition of #3 depending upon the first lower compensation film 13 and the second lower compensation film 14. The values listed in TABLE 1 are middle values in some ranges as representative values.

TABLE 1

| Type | | Conventional | Condition #1 | Condition #2 | Condition #3 | Unit |
|---|---|---|---|---|---|---|
| Upper polarizer | Angle | 0 | 0 | 0 | 0 | ° |
| Upper Second Compensator (λ/2) | Material And (for 550 nm) | ARTON 275 | ARTON 260 | ARTON 260 | ARTON 260 | Nm |
| | Angle | 75 | 164 | 164 | 164 | ° |
| Upper First Compensator (λ/4) | Material And (for 550 nm) | ARTON 138 | ARTON 140 | ARTON 140 | ARTON 140 | nm |
| | Angle | 15 | 106 | 106 | 106 | ° |
| Liquid Crystal | Δn (for 589 nm) | 0.078 | 0.078 | 0.078 | 0.078 | |
| | Cell Gap | 3.0 | 3.0 | 3.0 | 3.0 | μm |
| | Twist Angle | 80 | 72 | 72 | 72 | ° |
| | Average Direction of Alignment | 12 | 8 | 8 | 8 | hour |
| Lower First Compensator (λ/4) | Material And (for 550 nm) | ARTON 138 | ARTON 145 | ARTON 140 | ARTON 140 | nm |
| | Angle | 15 | 164 | 162 | 164 | ° |
| Lower First Compensator | Material And (for 550 nm) | ARTON 275 | ARTON 270 | ARTON 270 | ARTON 275 | nm |

TABLE 1-continued

| Type | | Conventional | Condition #1 | Condition #2 | Condition #3 | Unit |
|---|---|---|---|---|---|---|
| (λ/2) | Angle | 75 | 105 | 104 | 105 | ° |
| Lower Polarizer | Angle | 90 | 90 | 90 | 90 | ° |

"ARTON" in TABLE I indicates a name of a commercially available product. The average direction of alignment of the LC molecules refers to the average in the alignment direction on a surface of the TFT array panel and on a surface of the color filter array panel.

Figure 2:
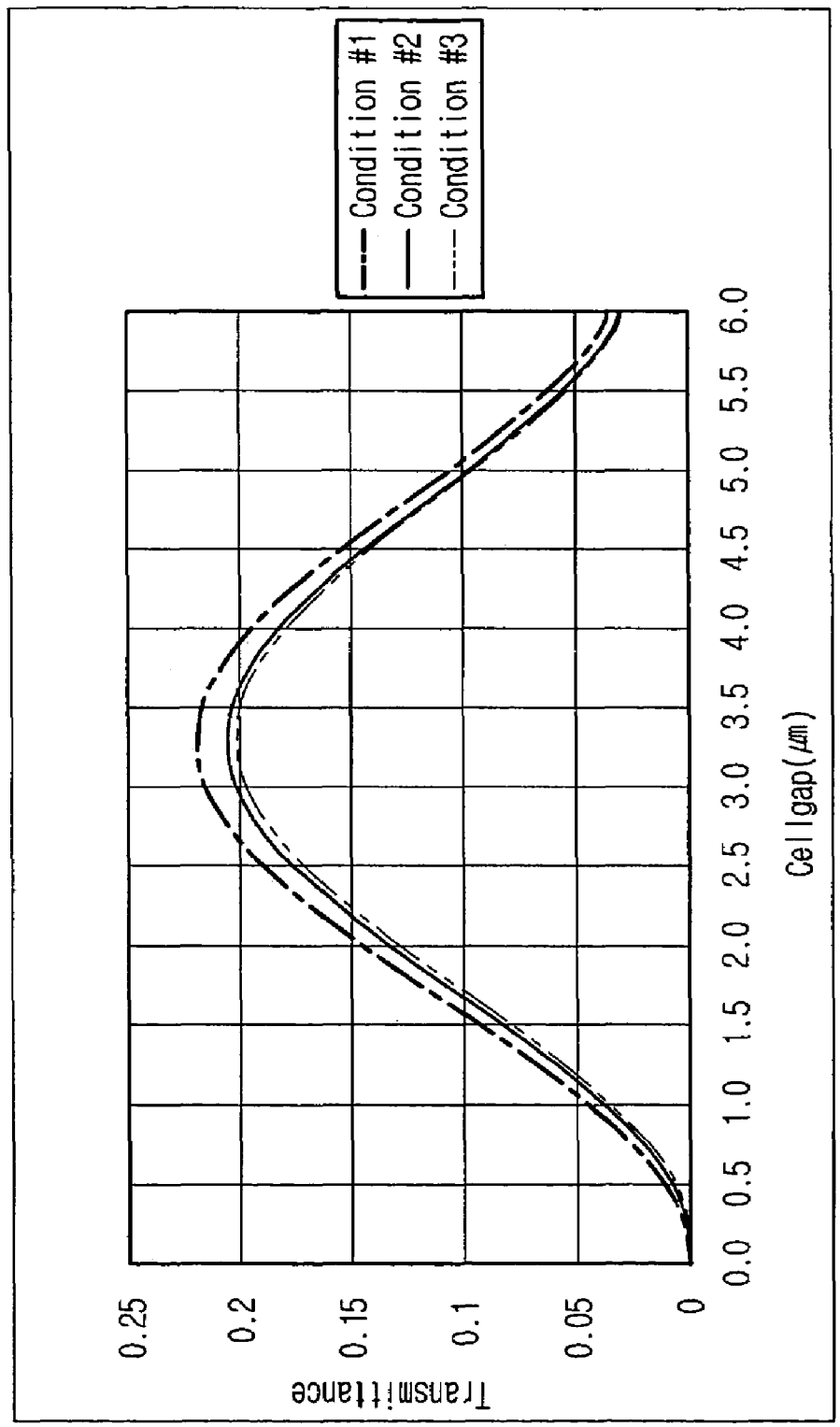
FIG. 2 is a simulation graph illustrating the transmittance of an LCD in a white state as function of the cell gap of the LCD for three different conditions.

FIG. 2 is a simulation graph illustrating the transmittance of an LCD in a white state as function of the cell gap of the LCD for the conditions #1 to #3 specified in TABLE 1.

As shown in FIG. 2, the three conditions exhibit maximum transmittance for the cell gap of about 3.3 microns and the condition #1 shows the highest transmittance.

Figure 3:
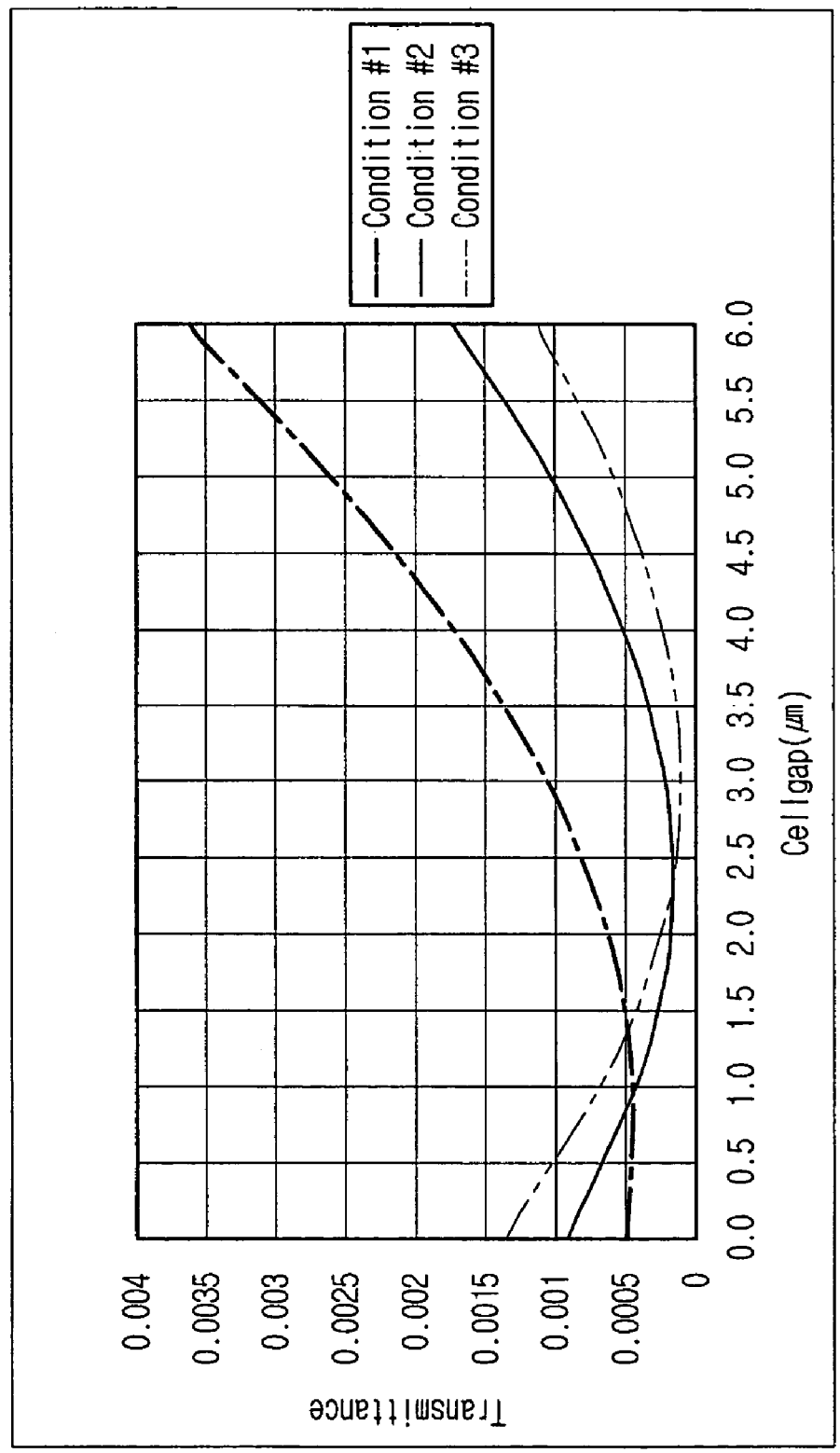
FIG. 3 is a measured graph illustrating the transmittance of an LCD in a black state as function of the cell gap of the LCD for three different conditions.

FIG. 3 is a measured graph illustrating the transmittance of an LCD in a black state as function of the cell gap of the LCD for the conditions #1 to #3 specified in TABLE 1.

As shown in FIG. 3, the condition #3 shows the minimum transmittance for the cell gap of about 3.0 microns to have the best black characteristic. The conditions #1 and #2 exhibit the minimum transmittance when the cell gaps are about 1.0 microns and about 2.3 microns, respectively.

Figure 4:
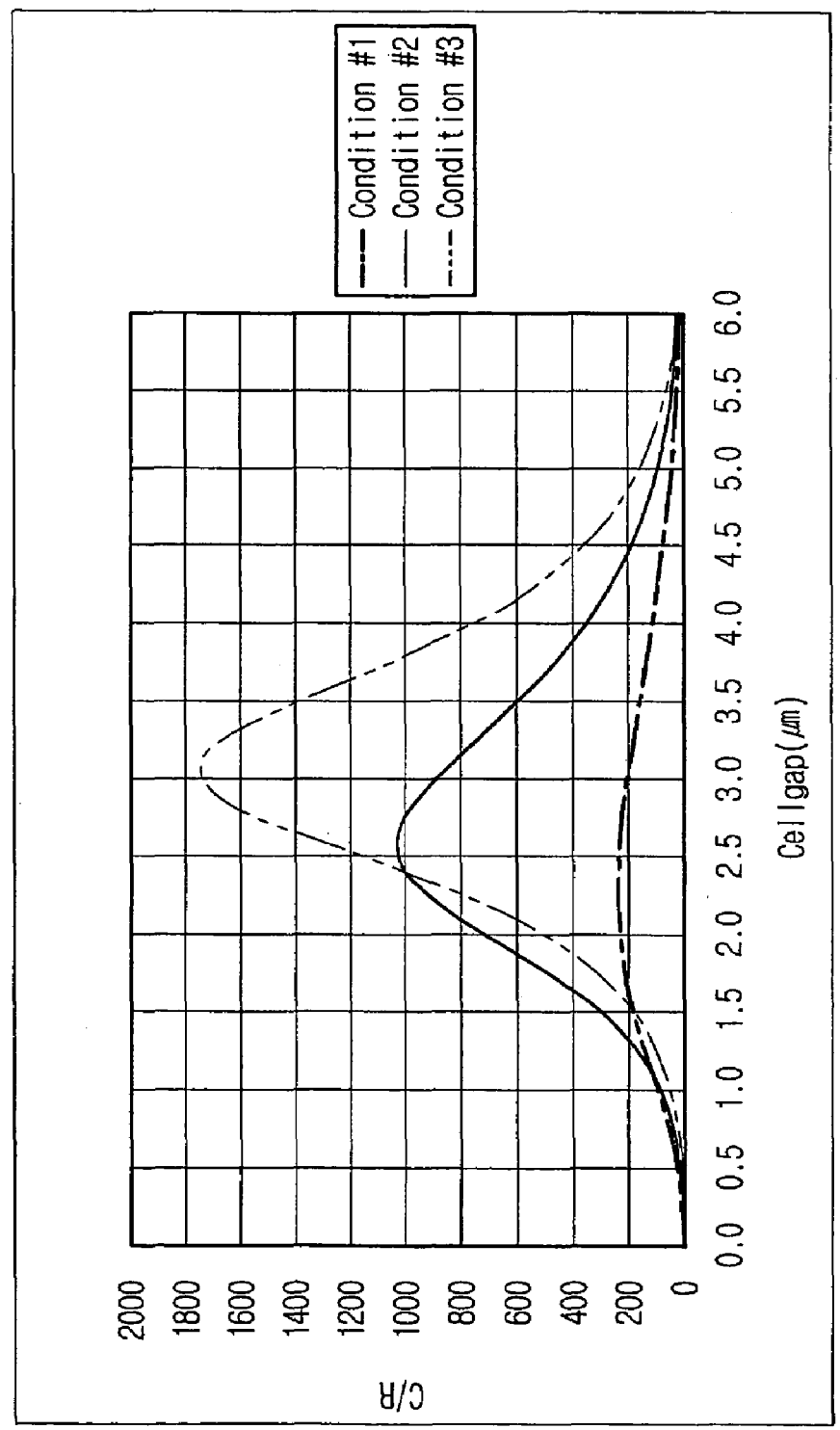
FIG. 4 is a measured graph illustrating the contrast ratio of an LCD as function of the cell gap of the LCD for three different conditions.

FIG. 4 is a measured graph illustrating the contrast ratio of an LCD as function of the cell gap of the LCD for the conditions #1 to #3 specified in TABLE 1.

The condition #3 exhibits the maximum contrast ratio when the cell gap is about 3.0 microns. The conditions #1 and #2 show the maximum contrast ratio when the cell gaps are about 2.6 microns and about 2.3 microns, respectively. Since the contrast ratio under the condition #3 among the three conditions is the best, the condition #3 is advantageous in improving the contrast ratio.

Figure 5:
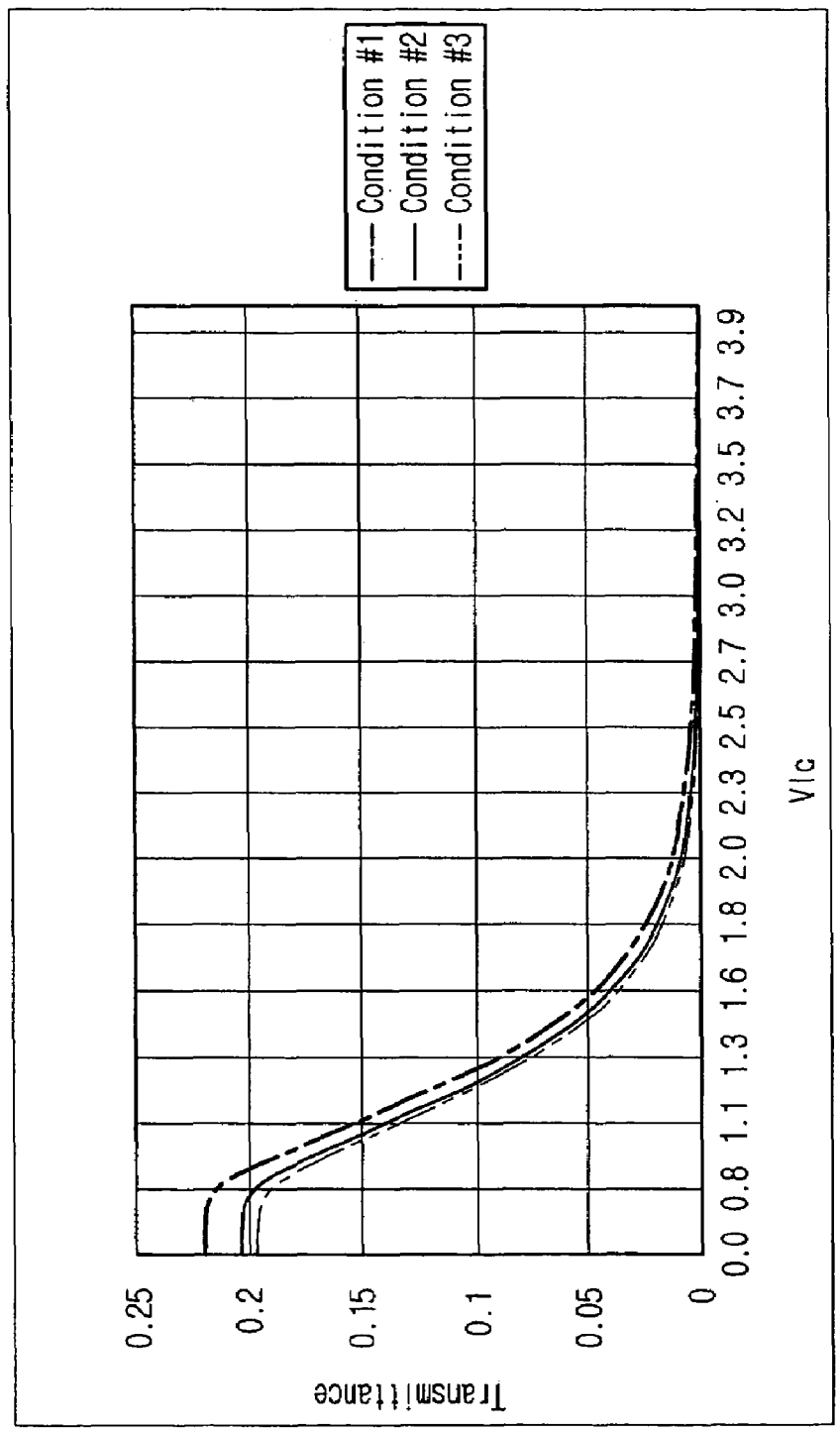
FIG. 5 illustrates the voltage-transmittance (V-T) curves of an LCD having a cell gap of about 3 microns for three different conditions.

FIG. 5 illustrates the voltage-transmittance (V-T) curves of an LCD having a cell gap of about 3 microns for the conditions #1 to #3 specified in TABLE 1.

The condition #1 exhibits the highest transmittance, the condition #2 does the next, and the condition #3 does the lowest. Therefore, the condition #1 is advantageous in improving the transmittance.

Figure 6:
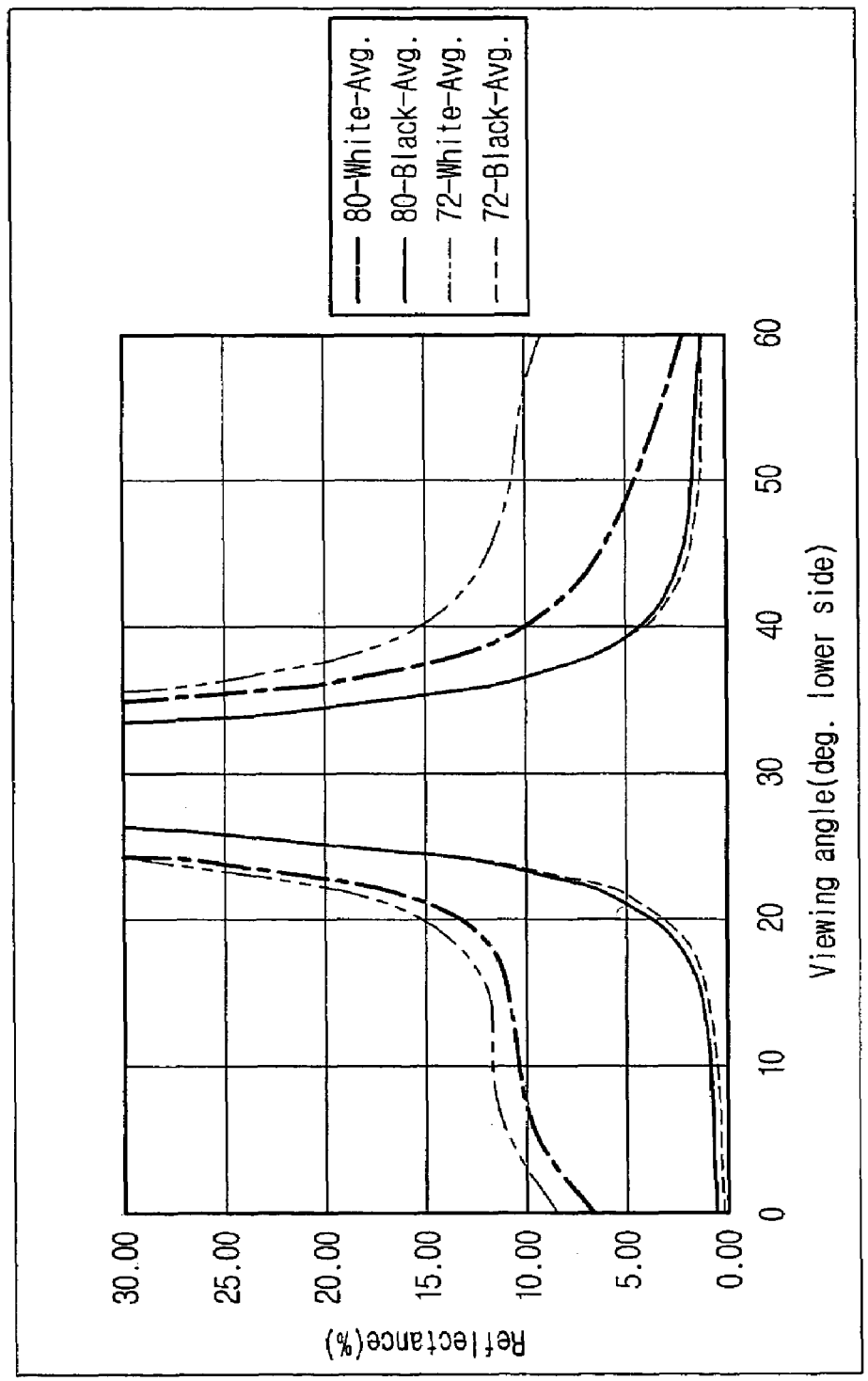
FIG. 6 is a graph illustrating the reflectance as a function of the viewing angle for an LCD according to an embodiment of the present invention and a conventional LCD when a spot light source is used.
Figure 7:
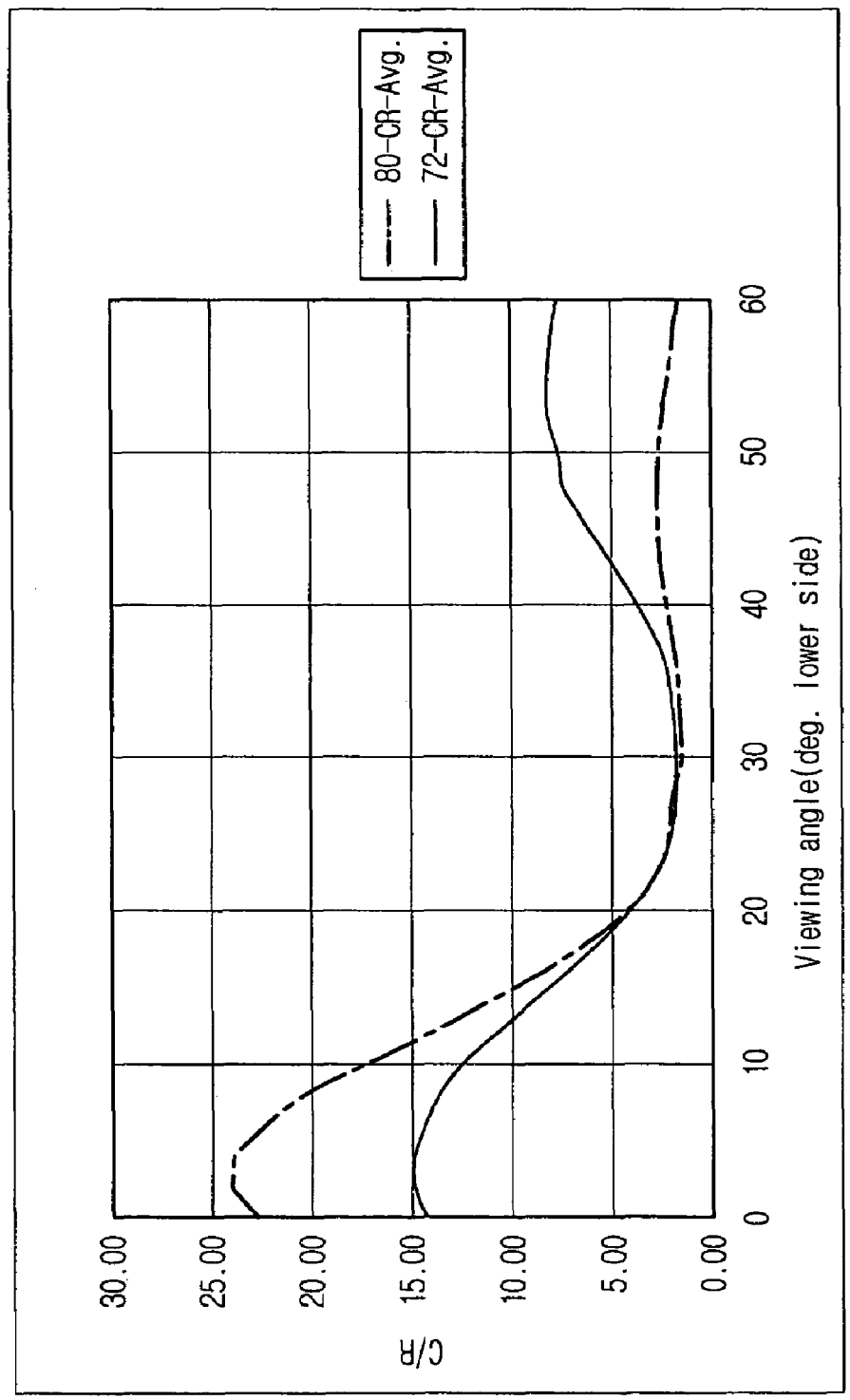
FIG. 7 is a graph illustrating the contrast ratio as a function of the viewing angle for an LCD according to an embodiment of the present invention and a conventional LCD when a spot light source is used.

FIG. 6 is a graph illustrating the reflectance as a function of the viewing angle for an LCD under the condition #1 and a conventional LCD when a spot light source is used, and FIG. 7 is a graph illustrating the contrast ratio as a function of the viewing angle for the above-described LCDs.

FIG. 6 was obtained by measuring the reflectance in black and white states as function of a lower side viewing angle ranging from about 0° to about 60° when a light from the spot light source is incident thereto with an angle of about 30° and FIG. 7 was obtained by calculating the contrast ratio from the measured reflectance.

The number 80 in FIGS. 6 and 7 refers to a twist angle of the conventional LCD, and the number 72 refers to a twist angle of the LCD under the condition #1.

For the viewing angle less than about 30 degrees, the black characteristic of the conventional LCD in the reflective mode is better than that of the LCD under the condition #1 in the reflective mode. However, the latter is better than the former in the viewing angle larger than about 30°.

The white characteristic in the reflective mode of the LCD under the condition #1 is better than that of the conventional LCD as a whole, and it becomes better as the angle becomes greater.

As shown in FIG. 7, although the contrast ratio of the conventional LCD is higher than that of the condition #1 LCD up to about 20°, the latter is higher than the former for the viewing angle larger than about 20 degrees.

Figure 8:
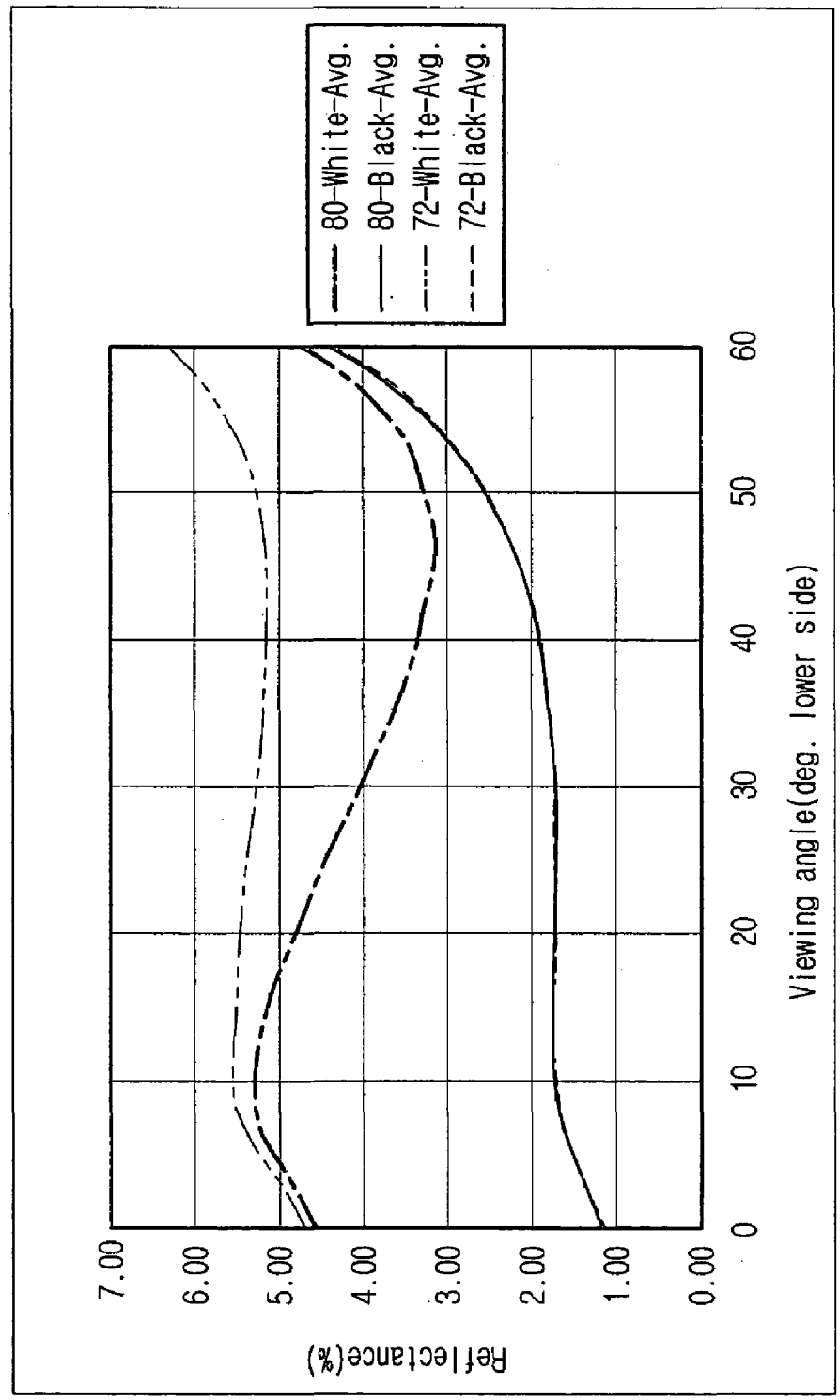
FIG. 8 is a graph illustrating the reflectance as a function of the viewing angle for an LCD according to an embodiment of the present invention and a conventional LCD when an integrating sphere type light source is used.
Figure 9:
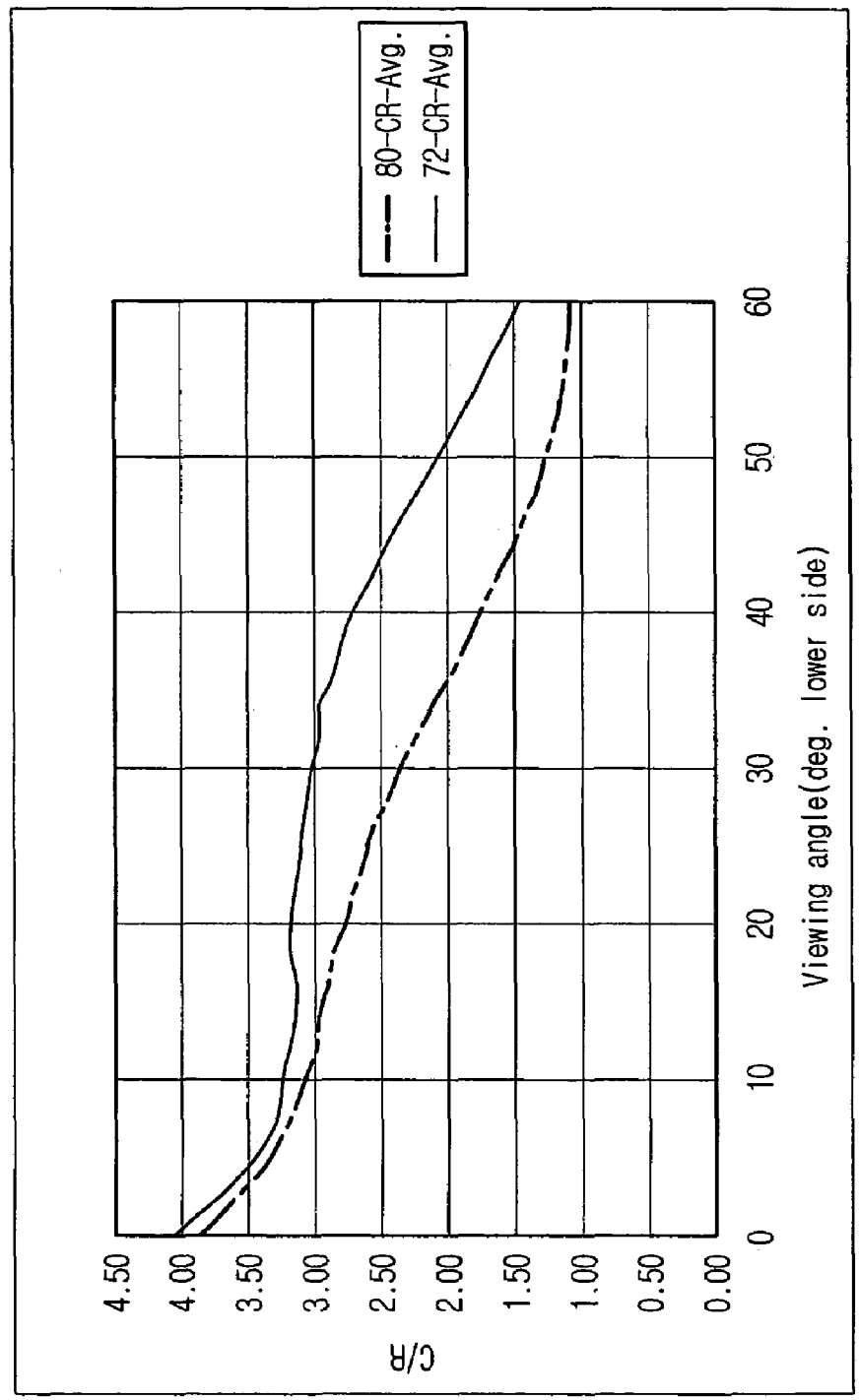
FIG. 9 is a graph illustrating the contrast ratio as a function of the viewing angle for an LCD according to an embodiment of the present invention and a conventional LCD when an integrating sphere type light source is used.

FIG. 8 is a graph illustrating the reflectance as a function of the viewing angle for an LCD according to an embodiment of the present invention and a conventional LCD when an integrating sphere type light source is used, and FIG. 9 is a graph illustrating the contrast ratio as a function of the viewing angle for the above-described LCDs.

FIG. 8 was obtained by measuring the reflectance in black and white states as function of a lower side viewing angle ranging from about 0° to about 60° and FIG. 7 was obtained by calculating the contrast ratio from the measured reflectance.

The number 80 in FIGS. 8 and 9 refers to a twist angle of the conventional LCD, and the number 72 refers to a twist angle of the LCD under the condition #1.

The reflective mode black characteristics of the conventional LCD and of the inventive LCD are nearly equal to each other.

The reflective mode white characteristic of the inventive LCD is better than that of the conventional LCD as a whole. In particular, although the conventional LCD shows drastic decrease of the luminance as the viewing angle becomes large, the inventive LCD has the luminance smoothly varying within a predetermined range.

Accordingly, as shown in FIG. 9, the inventive LCD exhibits the contrast ratio higher than the conventional LCD as a whole.

Figure 10:
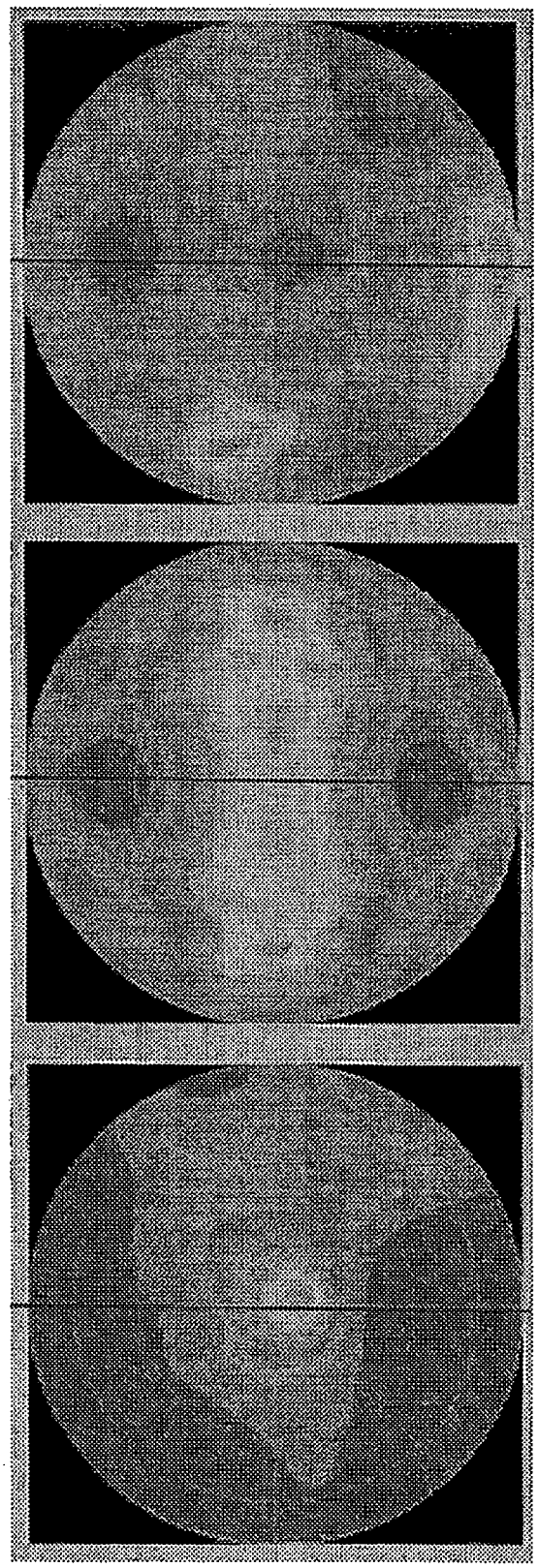
FIG. 10 is a graph illustrating a transmissive mode viewing angle characteristic of a conventional LCD.
Figure 11:
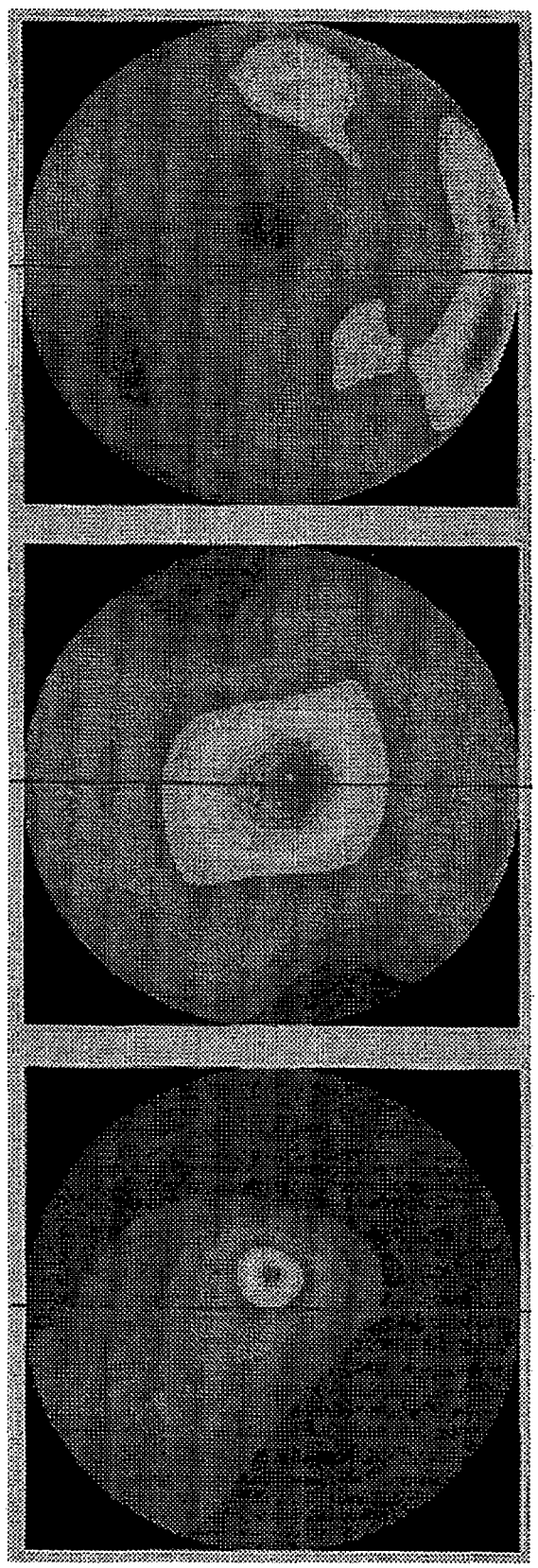
FIG. 11 is a graph illustrating a transmissive mode viewing angle characteristic of an LCD according to an embodiment of the present invention.

FIG. 10 is a graph illustrating a transmissive mode viewing angle characteristic of a conventional LCD, and FIG. 11 is a graph illustrating a transmissive mode viewing angle characteristic of an LCD under the condition #1.

As shown in FIGS. 10 and 11, in the transmissive mode, although the white luminance of the inventive LCD is deteriorated in the horizontal direction, it is improved in the vertical direction, compared with the conventional LCD. Therefore, although the contrast ratio (C/R) of the inventive LCD equal to or greater than 10:1 is narrowed in the horizontal direction, it is enlarged in the vertical direction.

Figure 12:
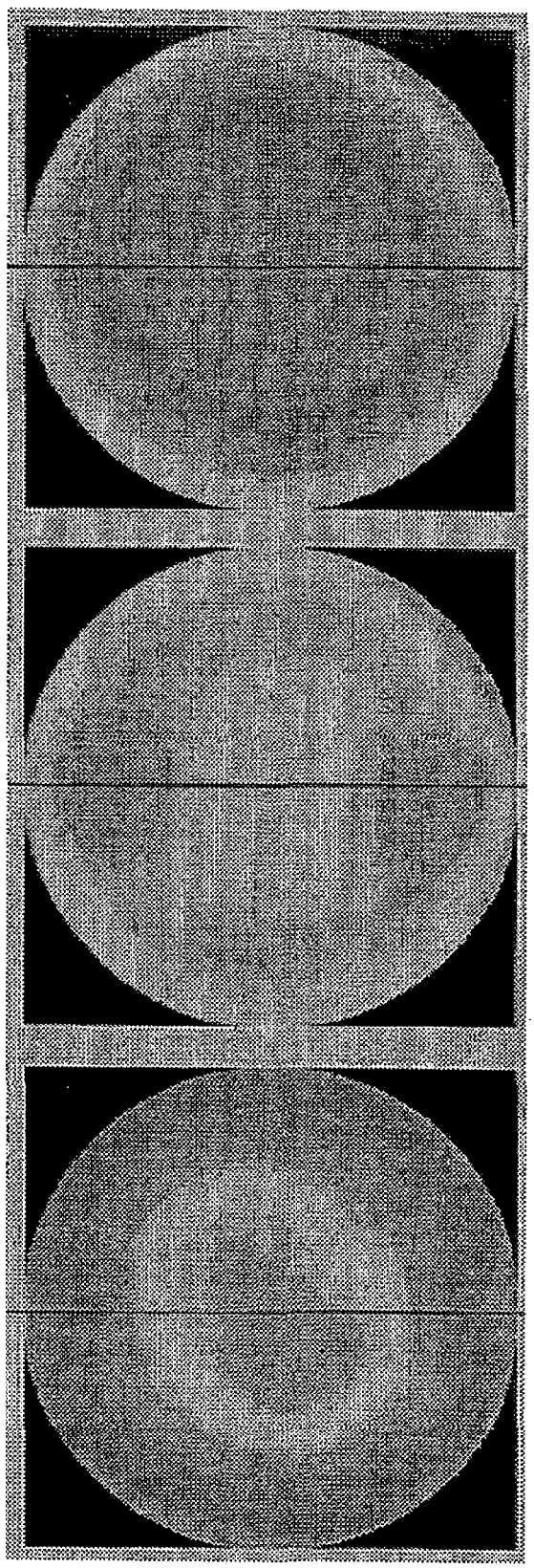
FIG. 12 is a graph illustrating a reflective mode viewing angle characteristic in a conventional LCD.
Figure 13:
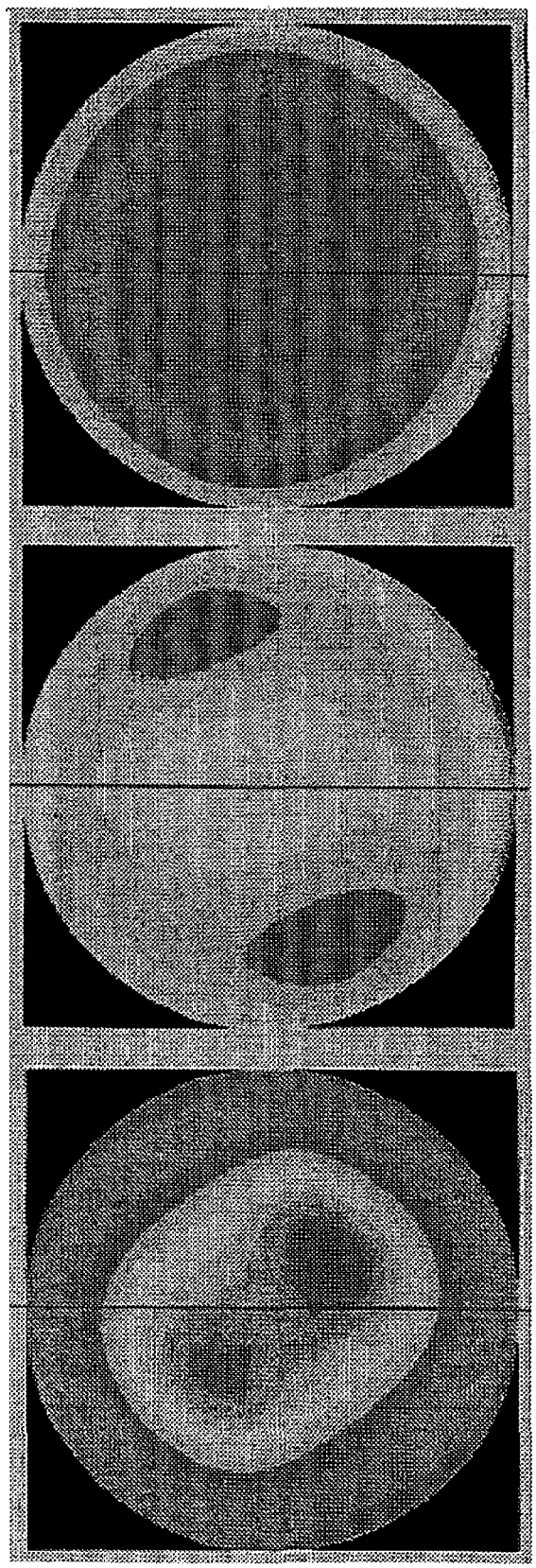
FIG. 13 is a graph illustrating a reflective mode viewing angle characteristic in an LCD according to an embodiment of the present invention.

FIG. 12 is a graph illustrating a reflective mode viewing angle characteristic of a conventional LCD, and FIG. 13 is a graph illustrating a reflective mode viewing angle characteristic of an LCD according to an embodiment of the present invention.

As shown in FIGS. 12 and 13, the viewing angle of the inventive LCD in the vertical direction is improved even in the reflective mode as well as in the transmissive mode. In detail, although the white luminance of the inventive LCD is deteriorated in the horizontal direction, it is improved in the vertical direction, compared with the conventional LCD. Therefore, although the contrast ratio (C/R) of the inventive LCD equal to or greater than 10:1 is narrowed in the horizontal direction, it is enlarged in the vertical direction.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
    a first substrate having inner and outer surfaces;
    a transparent electrode formed on the inner surface of the first substrate;

a reflective electrode formed on the transparent electrode and having a transmissive window overlapping a portion of the transparent electrode;

a thin film transistor connected to the transparent electrode and the reflective electrode;

a second substrate having an inner surface facing the inner surface of the first substrate and an outer surface;

a common electrode formed on the inner surface of the second substrate;

a liquid crystal layer interposed between the first substrate and the second substrate;

a first polarizing film disposed on the outer surface of the first substrate;

first and second compensation films interposed between the first substrate and the first polarizing film;

a second polarizing film disposed on the outer surface of the second substrate; and third and fourth compensation films interposed between the second substrate and the second polarizing film, wherein liquid crystal molecules of the liquid crystal layer are aligned twisted from the first substrate to the second substrate by a predetermined twist angle ranging from about 62° to about 82°, and when, from a front view, a horizontal direction is defined as an x direction and a vertical direction is defined as a y direction, a director of the liquid crystal layer has an azimuthal angle of about 170 to about 250°;

the first compensation film makes a retardation of about 135–155 nm for a light with a wavelength of about 550 nm, and a stretch axis of the first compensation film has an azimuthal angle ranging from about 154° to about 174°;

the second compensation film makes a retardation of about 260–280 nm for a light with a wavelength of 550 nm, and a stretch axis of the second compensation film has an azimuthal angle ranging from about 95° to about 115°;

the third compensation film makes a retardation of about 130–150 nm for a light with a wavelength of 550 nm, and a stretch axis of the third compensation film has an azimuthal angle ranging from about 96° to about 116°; and the fourth compensation film makes a retardation of about 250–270 nm for a light with a wavelength of 550 nm, and a stretch axis of the fourth compensation film has an azimuthal angle ranging from about 154° to about 174°.

2. The liquid crystal display of claim 1, wherein the second polarizer has an absorption axis located at an azimuthal angle ranging from about −10° to about 10°, and the first polarizer has an absorption axis located at an azimuthal angle ranging from about 80° to about 100°.

3. A liquid crystal display comprising:
a first substrate having inner and outer surfaces;
a transparent electrode formed on the inner surface of the first substrate;
a reflective electrode formed on the transparent electrode and having a transmissive window overlapping a portion of the transparent electrode;
a thin film transistor connected to the transparent electrode and the reflective electrode;
a second substrate having an inner surface facing the inner surface of the first substrate and an outer surface;
a common electrode formed on the inner surface of the second substrate;
a liquid crystal layer interposed between the first substrate and the second substrate;
a first polarizing film disposed on the outer surface of the first substrate;
first and second compensation films interposed between the first substrate and the first polarizing film;
a second polarizing film disposed on the outer surface of the second substrate; and
third and fourth compensation films interposed between the second substrate and the second polarizing film, wherein liquid crystal molecules of the liquid crystal layer are aligned twisted from the first substrate to the second substrate by a predetermined twist angle ranging from about 62° to about 82°, and when, from a front view, a horizontal direction is defined as an x direction and a vertical direction is defined as a y direction, a director of the liquid crystal layer has an azimuthal angle of about 170 to about 250°;

the first compensation film makes a retardation of about 130–150 nm for a light with a wavelength of about 550 nm, and a stretch axis of the first compensation film has an azimuthal angle ranging from about 152° to about 172°;

the second compensation film makes a retardation of about 260–280 nm for a light with a wavelength of 550 nm, and a stretch axis of the second compensation film has an azimuthal angle ranging from about 94° to about 114°;

the third compensation film makes a retardation of about 130–150 nm for a light with a wavelength of 550 nm, and a stretch axis of the third compensation film has an azimuthal angle ranging from about 96° to about 116°; and the fourth compensation film makes a retardation of about 250–270 nm for a light with a wavelength of 550 nm, and a stretch axis of the fourth compensation film has an azimuthal angle ranging from about 154° to about 174°.

4. The liquid crystal display of claim 3, wherein the second polarizer has an absorption axis located at an azimuthal angle ranging from about −10° to about 10°, and the first polarizer has an absorption axis located at an azimuthal angle ranging from about 80° to about 100°.

5. A liquid crystal display comprising:
a first substrate having inner and outer surfaces;
a transparent electrode formed on the inner surface of the first substrate;
a reflective electrode formed on the transparent electrode and having a transmissive window overlapping a portion of the transparent electrode;
a thin film transistor connected to the transparent electrode and the reflective electrode;
a second substrate having an inner surface facing the inner surface of the first substrate and an outer surface;
a common electrode formed on the inner surface of the second substrate;
a liquid crystal layer interposed between the first substrate and the second substrate;
a first polarizing film disposed on the outer surface of the first substrate;
first and second compensation films interposed between the first substrate and the first and the first polarizing film;

a second polarizing film disposed on the outer surface of the second substrate; and third and fourth compensation films interposed between the second substrate and the second polarizing film, wherein liquid crystal molecules of the liquid crystal layer are aligned twisted from the first substrate to the second substrate by a predetermined twist angle ranging from about 62° to about 82°, and when, from a front view, a horizontal direction is defined as an x direction and a vertical direction is defined as a y direction, a director of the liquid crystal layer has an azimuthal angle of about 170 to about 250°; the first compensation film makes a retardation of about 130–150 nm for a light with a wavelength of about 550 nm, and a stretch axis of the first compensation film has an azimuthal angle ranging from about 154° to about 174°;

the second compensation film makes a retardation of about 260–280 nm for a light with a wavelength of 550 nm, and a stretch axis of the second compensation film has an azimuthal angle ranging from about 95° to about 115°;

the third compensation film makes a retardation of about 130–150 nm for a light with a wavelength of 550 nm, and a stretch axis of the third compensation film has an azimuthal angle ranging from about 96° to about 116°; and the fourth compensation film makes a retardation of about 250–270 nm for a light with a wavelength of 550 nm, and a stretch axis of the fourth compensation film has an azimuthal angle ranging from about 154° to about 174°.

6. The liquid crystal display of claim 5, wherein the second polarizer has an absorption axis located at an azimuthal angle ranging from about −10° to about 10°, and the first polarizer has an absorption axis located at an azimuthal angle ranging from about 80° to about 100°.

* * * * *